United States Patent [19]

Püntener et al.

[11] 4,315,854
[45] Feb. 16, 1982

[54] CHROMIUM AND COBALT COMPLEX AMINO HYDROXY AZOMETHINE DYES

[75] Inventors: Alois Püntener, Rheinfelden; Fabio Beffa, Riehen, both of Switzerland

[73] Assignee: Ciba-Geigy Corporation, Ardsley, N.Y.

[21] Appl. No.: 132,964

[22] Filed: Mar. 24, 1980

[30] Foreign Application Priority Data

Mar. 28, 1979 [CH] Switzerland .......................... 2877/79
Mar. 3, 1980 [CH] Switzerland .......................... 1663/80

[51] Int. Cl.³ .................... C09B 45/16; C09B 45/20; C09B 45/26; C09B 45/30
[52] U.S. Cl. .......................... 260/145 A; 260/145 B; 260/145 C; 260/146 R; 260/146 D; 260/146 T; 260/147; 260/148; 260/149; 260/150; 260/151
[58] Field of Search .......... 260/145 A, 145 B, 145 C, 260/148, 147, 146 R, 146 T, 146 D, 149

[56] References Cited

U.S. PATENT DOCUMENTS

| | | | |
|---|---|---|---|
| 2,985,646 | 5/1961 | Schetty et al. | 260/145 B |
| 3,391,132 | 7/1968 | Beffa et al. | 260/145 A |
| 4,052,374 | 10/1977 | Baumann | 260/145 A |
| 4,085,097 | 4/1978 | Beffa et al. | 260/145 A |
| 4,102,879 | 7/1978 | Baumann | 260/149 |
| 4,116,952 | 9/1978 | Beffa et al. | 260/145 B |

*Primary Examiner*—Floyd D. Higel
*Attorney, Agent, or Firm*—Edward McC. Roberts

[57] ABSTRACT

1:2 Metal complex dyes of azomethines of the formula

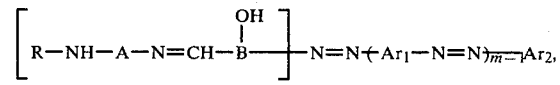

wherein R is hydrogen, unsubstituted or substituted alkyl, aralkyl, aryl, alkylsulfonyl or arylsulfonyl, A is the radical of an aliphatic 1,2- or 1,3-diamine or of a carbocyclic or heterocyclic 1,2-diamine, B is the radical of an aromatic o-hydroxyaldehyde, $Ar_1$ is an aromatic radical, m is 1 or 2, and $Ar_2$ is an aromatic-carbocyclic or heterocyclic radical. These dyes are suitable for dyeing and printing polyamide materials. The dyes are distinguished by their excellent fastness properties, especially good lightfastness. They have good covering power; produce level dyeings; and have good fastness to washing, water, perspiration, alkali, acid, diffusion and rubbing. Strong yellow, yellowish brown, reddish brown, dark brown or olive brown shades are obtained.

7 Claims, No Drawings

CHROMIUM AND COBALT COMPLEX AMINO HYDROXY AZOMETHINE DYES

The present invention relates to novel 1:2 metal complex dyes which contain, bonded to a heavy metal atom, two identical or different azomethines of the formula

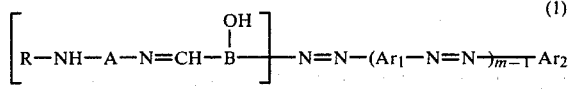 (1)

wherein R is hydrogen, unsubstituted or substituted alkyl, aralkyl, aryl, alkylsulfonyl or arylsulfonyl, A is the radical of an aliphatic 1,2- or 1,3-diamine or is the radical of a carbocyclic or heterocyclic 1,2-diamine, B is the radical of an aromatic o-hydroxyaldehyde, $Ar_1$ is an aromatic radical, m is 1 or 2, and $Ar_2$ is an aromatic-carbocyclic or heterocyclic radical.

Suitable heavy metals are iron, and chromium and cobalt.

In particular, the invention relates to 1:2 metal complexes wherein two molecules of the formula (1) are bonded to a chromium or cobalt atom and wherein R has the same meaning as in formula (1), A is an unsubstituted or substituted alkylene or alkenylene radical or an arylene radical, and B is the radical of an o-hydroxybenzaldehyde.

By aliphatic radicals, especially by alkyl, alkylene and alkenylene, are meant in particular low molecular radicals. Possible substituents of these radicals are e.g. the hydroxyl and the cyano group. Thus R can also be e.g. the β-hydroxyethyl or β-cyanoethyl group. Throughout this specification, the term "low molecular" denotes groups containing 1 to 6, preferably 1 to 2, carbon atoms. The terms "aryl" and "arylene" denote in particular phenyl and phenylene respectively, and phenyl and phenylene which are substituted by cyano, halogen, nitro, sulfo, carboxyl, sulfamoyl, N-mono- or N,N-dialkylated sulfamoyl, alkylsulfonyl, the phosphonic acid group, low molecular alkyl or alkoxy or acylamino. Aralkyl is in particular the benzyl group and alkenylene is e.g. the vinylene group which is substituted by cyano.

The term "acylamino" denotes herein especially aroylamino, in particular benzoylamino, alkanoylamino and alkoxycarbonylamino, each containing 1 to 4 carbon atoms, especially acetylamino or methoxy- or ethoxycarbonylamino, as well as ureido.

Examples of suitable diamines from which the radical A is derived are: 1,2-diaminobenzene, 1,2-diamino-4-nitrobenzene, 1,2-diaminobenzene-4-carboxylic acid, 1,2-diaminobenzene-4-sulfonic acid, 1,2-diaminobenzene-4-phosphonic acid, 1,2-diamino-4-methylbenzene, 1,2-diamino-4-chlorobenzene, 1,2-diamino-4-sulfamoylbenzene, 1-amino-2-methylaminobenzene, 1-amino-2-(4'-chlorophenylamino)-benzene, 1-amino-2-ethylaminobenzene, 1-amino-2-methylamino-5-methylsulfonylbenzene, 1-amino-2-butylamino-5-methylsulfonylbenzene, 1,2-diaminoethane, 1,3-diaminopropane, 1-amino-2-(phenylamino)-ethane, 1,2-diamino-1,2-dicyanoethylene, 1-amino-2-(tosylamino)-ethane, 1-amino-3-(tosylamino)-propane, 1-amino-2-(tosylamino)-benzene, 1-amino-2-methylsulfonylaminobenzene, 1-amino-2-(2',4'-dinitrophenylamino)-benzene, 1-amino-2-(2'-nitro-4'-sulfophenylamino)-benzene, 1-amino-2-(2'-nitro-4'-methylsulfonylphenylamino)-benzene, 1,2-diaminonaphthalene, 2,3-diamino-5,6-dicyanopyrazine, as well as 1,2-diamino-4,5-dichlorobenzene.

Examples of suitable o-hydroxyaldehydes are: 2-hydroxybenzaldehyde, 5-methyl-2-hydroxybenzaldehyde, 3,5-dimethyl-2-hydroxybenzaldehyde, 5-butyl-2-hydroxybenzaldehyde, 3,5-dichloro-2-hydroxy-benzaldehyde, 3-chloro-5-methyl-2-hydroxybenzaldehyde, 3-methyl-5-chloro-2-hydroxybenzaldehyde, as well as in particular 2-hydroxybenzaldehydes which are substituted in the 5-position by an arylazo or arylazoaryleneazo group.

The metal complexes of the present invention are obtained by reacting an azomethine of the formula (1) or a mixture of an amine of the formula

 (4)

and an aldehyde of the formula

 (5)

with a metal donor, in the ratio 2:1. The metal donor is an iron donor, but preferably a chromium or cobalt donor, e.g. a salt of divalent cobalt or of trivalent chromium, such as cobalt sulfate, chromium chloride, cobalt or chromium acetate, or a complex salt such as the chromium salicylate complex. The above mentioned simple salts can also be employed in the presence of a chelating agent, e.g. tartaric acid or lactic acid.

Especially interesting metal complexes are the chromium or cobalt complexes which contain, bonded to a chromium or cobalt atom, two azomethine molecules of the formula

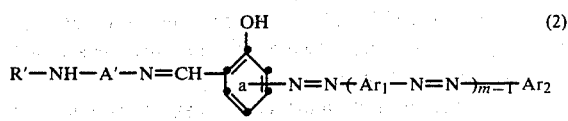 (2)

wherein R' is hydrogen, low molecular unsubstituted or substituted alkyl or unsubstituted or substituted phenyl, A' is ethylene, propylene, 1,2-dicyanovinylene or unsubstituted or substituted phenylene, $Ar_1$ is an unsubstituted or substituted phenylene or naphthylene radical, m is 1 or 2 and $Ar_2$ is a benzene or naphthalene radical or a heterocyclic radical.

The radical $Ar_2$ can carry the customary substituents of diazo components. $Ar_2$ as a heterocyclic radical is e.g. a thiazolyl, benzthiazolyl, imidazolyl, quinolinyl, oxazolyl or benzoxazolyl radical.

It is preferred, however, that $Ar_2$ is a phenyl radical which is unsubstituted or substituted by chlorine, bromine, nitro, arylamino, sulfo, sulfamoyl, N-mono- or N,N-dialkylated sulfamoyl, alkylsulfonyl, alkyl or alkoxy, or a naphthyl radical which is unsubstituted or substituted by sulfo. $Ar_1$ is preferably a phenylene or naphthylene radical and possible substituents are chiefly the sulfo group and—in the case of the phenylene radical—low molecular alkyl and alkoxy radicals, e.g. methyl, ethyl, and methoxy. R' is preferably hydrogen or phenyl which is unsubstituted or substituted by chlorine, sulfo, methylsulfonyl or nitro.

A' is especially the phenylene radical or a phenylene radical which is substituted by one or two of the following substituents: sulfo, sulfamoyl, carboxyl, N-mono- or N,N-dialkylated sulfamoyl, alkylsulfonyl, chlorine, bromine, nitro, alkyl and alkoxy.

The arylazo or arylazoarylene-azo group is bonded to the benzene ring a in the ortho- or preferably in the paraposition to the hydroxyl group, and the alkyl and alkoxy radicals are in particular low molecular groups.

Preferred compounds of the present invention are the 1:2 chromium or 1:2 cobalt complexes of the azomethine compounds of the formula

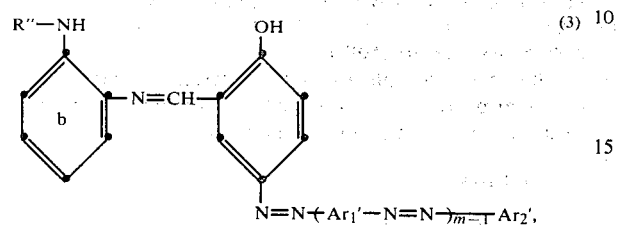

$$\text{N}=\text{N}-(\text{Ar}_1'-\text{N}=\text{N}-)_{m-1}\text{Ar}_2',$$ (3)

wherein R' is hydrogen or phenyl which is unsubstituted or substituted by chlorine, sulfo, methylsulfonyl or nitro, Ar$_1'$ is a phenylene radical which is unsubstituted or substituted by sulfo, alkyl or alkoxy, or a naphthylene radical which is unsubstituted or substituted by sulfo, and Ar$_2'$ is a phenyl radical which is unsubstituted or substituted by chlorine, bromine, nitro, acylamino, sulfo, sulfamoyl, N-mono- or N,N-dialkylated sulfamoyl, alkylsulfonyl, alkyl or alkoxy, or a naphthyl radical which is unsubstituted or substituted by sulfo, and wherein the benzene ring b is unsubstituted or carries one of the following substituents: sulfo, sulfamoyl, N-mono- or N,N-dialkylated sulfamoyl, alkylsulfonyl, chlorine, bromine, nitro, alkyl and alkoxy as well as carboxyl; and m is 1 or 2, and wherein the symbols R'', Ar$_1'$, Ar$_2'$ or the ring b together contain at least one water-solubilising group.

The introduction of an arylazo or arylazoarylene-azo group into the above mentioned o-hydroxyaldehydes is accomplished in conventional manner by coupling a compound of the formula $$\text{Ar}_2-\text{N}=\text{N}-\text{Ar}_1-\text{N}_2^\oplus \text{X}^\ominus \quad (6)$$

or $$\text{Ar}_2-\text{N}_2^\oplus \text{X}^\ominus \quad (7),$$

wherein X$^\ominus$ is an anion, with a o-hydroxyaldehyde. These compounds are preferably derived from naphthylamines and especially from anilines, e.g. 1-naphthylamine, 4,8-disulfo-2-naphthylamine, 6,8-disulfo-2-naphthylamine, 1-naphthylamine-3-, -4-, -5-, -6-, -7- or 8-sulfonic acid, m-aminobenzene-sulfamide, aniline, 2-, 3- or 4-sulfoaniline, 2-, 3- or 4-nitroaniline, 2-, 3- or 4-methylaniline, 2-, 3- or 4-methoxyaniline, 2-, 3-, or 4-chloroaniline, 2,5-dichloro-4-sulfoaniline, 2-chloro-5-sulfoaniline, 4-nitro-2-sulfoaniline, 4-methoxy- or 4-methyl-3-sulfoaniline, 2-nitro-4-sulfoaniline, 2,4- or 2,5-disulfoaniline, 3- or 4-aminoacetanilide, 3- or 4-amino-6-sulfoacetanilide, 3- or 4-carbomethoxyaminoaniline or 3-ureidoaniline.

Preferred dyes of the present invention are the chromium or cobalt complexes which contain, bonded to a metal atom, two azomethine atoms of the formula

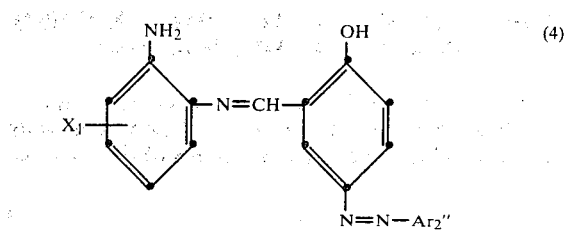

wherein X$_1$ is hydrogen, sulfo, low molecular alkyl, chlorine or nitro, and Ar$_2''$ is a phenyl or naphthyl radical which carries one or two sulfo groups and can be additionally substituted by low molecular alkyl, alkoxy, acylamino, nitro or chlorine.

The dyes of the present invention are obtained by metallisation in accordance with conventional methods which are known per se. The reaction can be carried out in organic solvents, e.g. alcohols, or in aqueous solution or in aqueous-organic medium, if desired also on the substrate itself, especially on wool. The azomethine compounds of the formula (1), or the mixtures of the amines of the formula (4) and the aldehydes of the formula (5), are advantageously reacted in a neutral to weakly alkaline medium with the metal donors. Depending on the metal, the process is carried out at room temperature or at elevated temperature, preferably in the range between 50° and 120° C. A stoichiometric amount or an excess of the metal donor is employed. It is possible to metallise either mixtures of azomethines of the formula (1) or an individual azomethine of the formula (1). In the former case, a mixture of symmetrical and asymmetrical metal complexes of the azomethine compounds employed is obtained. If desired, mixtures of metal donors can also be employed.

It is advantageous to isolate the metal complexes of the invention in the form of their salts, especially alkali salts, preferably lithium, sodium, potassium or ammonium salts, or in the form of salts of organic amines. Depending on their constitution, they are suitable for dyeing and printing a very wide variety of materials by a wide range of methods, especially for dyeing materials made from natural and synthetic polyamides, such as wool and silk, synthetic polyamide and polyurethane fibres, hairs, and, in particular, for dyeing leather and skins. They can also be used for printing the materials specified above. In addition, they can be used for colouring lacquers or spinning solutions/melts as well as for dyeing leather by the spraying method.

The new dyes are distinguished in particular by their excellent fastness properties, especially good lightfastness. They have good covering power and produce level dyeings while simultaneously having good fastness to washing, water, perspiration, alkali, acid, diffusion and rubbing. Strong yellow, yellowish brown, reddish brown, dark brown or olive brown shades are obtained.

The invention is illustrated by the following Examples, in which parts and percentages are by weight unless otherwise stated.

EXAMPLE 1

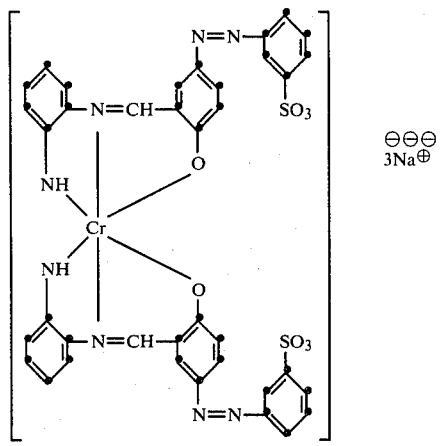

10.8 parts of 1,2-diaminobenzene and 30.6 parts of the monoazo dye obtained from diazotised 1-aminobenzene-3-sulfonic acid and salicylaldehyde are added to 250 parts by volume of water, and then a solution of sodium chromosalicylate which contains 2.8 parts of chromium is added. The reaction mixture is adjusted with 2 N sodium hydroxide to pH 8 and refluxed. When the metallisation is complete, the water is removed by evaporation or spray drying. The residue is a dark powder which dyes leather in a yellow shade of excellent fastness properties.

EXAMPLE 2

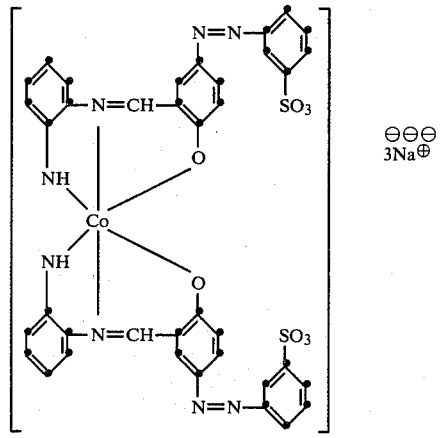

10.8 parts of 1,2-diaminobenzene and 30.6 parts of the monoazo dye obtained from diazotised 1-aminobenzene-3-sulfonic acid and salicylaldehyde are added to 250 parts by volume of water and then 16.9 parts of cobalt sulfaheptahydrate (corresponding to 3.54 parts of cobalt) are added. The reaction mixture is heated to 80° C. and kept at pH 8–9 with 2 N sodium hydroxide solution. When the metallisation is complete, the cobalt-containing dye is precipitated with sodium chloride, collected by filtration and dried. The resultant dark powder dyes leather in a medium brown shade of excellent fastness properties.

EXAMPLE 3

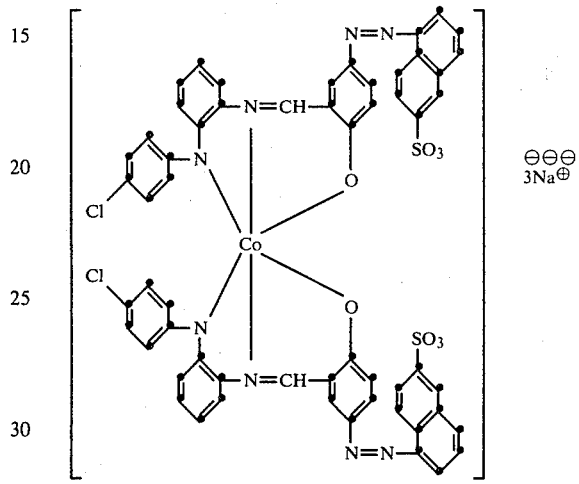

21.9 parts of 4'-chloro-2-amino-diphenylamine and 35.6 parts of the monoazo dye obtained from diazotised 1-aminonaphthalene-6-sulfonic acid and salicylaldehyde are suspended in 250 parts by volume of ethylene glycol. To this suspension are then added 16.9 parts of cobalt sulfaheptahydrate (corresponding to 3.54 parts of cobalt). The reaction mixture is heated to 85°–90° C. while simultaneously raising the pH value of the suspension to 8–9 by addition of 5 N sodium hydroxide solution. The reaction mixture is kept at this temperature, while keeping the pH constant with 5 N sodium hydroxide solution, until the metallisation is complete. The cobalt-containing dye is precipitated by addition of sodium chloride solution, then collected by filtration and dried. It is a dark powder which dissolves in water to form a brown solution and dyes leather in fast medium brown shades.

Further dyes having similar properties are obtained in analogous manner by reacting a mixture of the compounds listed in columns I and II of the following table with the metals of column III. These dyes colour leather in the shades indicated in column IV.

TABLE

| No. | I | II | III | IV |
| --- | --- | --- | --- | --- |
| 1 | NH$_2$-C$_6$H$_4$-NH$_2$ | OH-C$_6$H$_3$(CHO)-N=N-C$_6$H$_4$-SO$_3$H | Cr | fallow |
| 2 | " | " | Co | medium brown |

TABLE-continued

| No. | I | II | III | IV |
|---|---|---|---|---|
| 3 | " | 4-hydroxy-3-formyl-phenyl-azo-phenyl-azo-benzene-sulfonic acid | Cr | orange brown |
| 4 | " | " | Co | orange brown |
| 5 | 1,2-diaminobenzene (NH₂, NH₂) | 4-hydroxy-3-formyl-2-nitro-phenyl-azo-benzenesulfonic acid | Cr | fallow |
| 6 | " | " | Co | brown |
| 7 | " | 4-hydroxy-3-formyl-phenyl-azo-(3-nitro-4-sulfo)benzene | Co | dark brown |
| 8 | " | " | Cr | dark brown |
| 9 | 1,2-diaminobenzene | 4-hydroxy-3-formyl-2-sulfo-phenyl-azo-benzenesulfonic acid | Co | medium brown |
| 10 | " | hydroxy-formyl-sulfo-naphthyl-azo compound | Co | brown |
| 11 | " | " | Cr | medium brown |
| 12 | 4-chloro-2-amino-diphenylamine | 4-hydroxy-3-formyl-2-nitro-phenyl-azo-benzenesulfonic acid | Co | brown |
| 13 | 4-methyl-phenyl-SO₂-NH-CH₂-CH₂-NH₂ | 4-hydroxy-3-formyl-phenyl-azo-benzenesulfonic acid | Co | tan |
| 14 | 4-chloro-2-amino-diphenylamine | 4-hydroxy-3-formyl-phenyl-azo-(disulfo)benzene | Co | brown |

TABLE-continued

| No. | I | II | III | IV |
|---|---|---|---|---|
| 15 | 4-Cl-phenyl-NH-(2-aminophenyl) | 5-hydroxy-4-formyl-phenylazo-(4,8-disulfo-naphthalene) | Co | brown |
| 16 | " | 5-hydroxy-4-formyl-phenylazo-phenylazo-(4-sulfophenyl) | Co | red brown |
| 17 | CH$_3$SO$_2$-NH-(2-aminophenyl) | 5-hydroxy-4-formyl-phenylazo-(4-sulfophenyl) | Co | borwn |
| 18 | phenyl-NH-CH$_2$-CH$_2$-NH$_2$ | 4-hydroxy-phenylazo-(3-sulfophenyl) | Co | medium brown |
| 19 | (NC)(NH$_2$)C=C(NC)(NH$_2$) | " | Co | olive brown |
| 20 | " | " | Cr | tan |
| 21 | " | 5-hydroxy-4-formyl-phenylazo-(2-hydroxy-3-sulfo-naphthalene) | Co | brown |
| 22 | (NC)(NH$_2$)C=C(NC)(NH$_2$) | 5-hydroxy-4-formyl-3-sulfo-phenylazo-phenyl | Cr | medium brown |
| 23 | H$_2$N-CH$_2$-CH$_2$-NH$_2$ | 5-hydroxy-4-formyl-3-sulfo-phenylazo-phenyl | Co | fallow |
| 24 | 1,2-diaminobenzene | 2-hydroxy-3-formyl-phenylazo-phenyl | Cr | tan |
| 25 | 1,2-diaminobenzene | 2-hydroxy-3-formyl-phenylazo-phenyl | Co | brown |

4,315,854

TABLE-continued

| No. | I | II | III | IV |
|---|---|---|---|---|
| 26 | " | 2-hydroxy-3-formyl-phenyl azo 4-chlorophenyl (HO, CHO on benzene, N=N, Cl on benzene) | Co | brown |
| 27 | " | 2-hydroxy-3-formyl-phenyl azo 4-sulfophenyl (OH, CHO on benzene, N=N, SO₃H on benzene) | Co | medium brown |
| 28 | " | " | Cr | yellow |
| 29 | 1,2-diaminobenzene (NH₂, NH₂) | 2-hydroxy-3-formyl-phenyl azo (4-acetamido-2-sulfo)phenyl (OH, CHO; N=N; NH—CO—CH₃, SO₃H) | Cr | yellow |
| 30 | " | " | Co | medium brown |
| 31 | " | 2-hydroxy-3-formyl-phenyl azo (3-acetamido-6-sulfo)phenyl (OH, CHO; N=N; NH—CO—CH₃; SO₃H) | Cr | yellow |
| 32 | " | " | Co | medium brown |
| 33 | 1,2-diaminobenzene (NH₂, NH₂) | 2-hydroxy-3-formyl-phenyl azo 3-sulfophenyl (OH, CHO; SO₃H; N=N) | Fe | brown |
| 34 | " | 2-hydroxy-3-formyl-phenyl azo naphthalene disulfonic (OH, CHO; SO₃H; N=N; SO₃H on naphthalene) | Cr | tan |
| 35 | " | " | Co | brown |
| 36 | 3,4-diamino-toluene (NH₂, NH₂, CH₃) | 2-hydroxy-3-formyl-phenyl azo 4-sulfophenyl (OH, CHO; N=N; SO₃H) | Co | medium brown |
| 37 | " | " | Cr | yellow |
| 38 | " | 2-hydroxy-3-formyl-phenyl azo (4-acetamido-2-sulfo)phenyl (OH, CHO; N=N; NH—CO—CH₃; SO₃H) | Cr | yellow |
| 39 | " | " | Co | medium brown |

TABLE-continued

| No. | I | II | III | IV |
|---|---|---|---|---|
| 40 | 4-methyl-1,2-diaminobenzene (NH2, NH2, CH3) | 2-hydroxy-3-formyl-5-(acetylamino)-phenylazo-benzenesulfonic acid (OH, CHO, NH—CO—CH3, N=N, SO3H) | Cr | yellow |
| 41 | " | 2-hydroxy-3-formylphenylazo-benzenesulfonic acid (OH, CHO, N=N, SO3H) | Fe | brown |
| 42 | " | 2-hydroxy-3-formylphenylazo-naphthalenedisulfonic acid (OH, CHO, N=N, SO3H, SO3H) | Cr | tan |
| 43 | 4-methyl-1,2-diaminobenzene (NH2, NH2, CH3) | 2-hydroxy-3-formylphenylazo-naphthalenedisulfonic acid (OH, CHO, N=N, SO3H, SO3H) | Co | brown |
| 44 | " | 2-hydroxy-3-formylphenylazo-benzenesulfonic acid (OH, CHO, N=N, SO3H) | Co | medium brown |
| 45 | " | " | Cr | yellow |
| 46 | 4-methyl-1,2-diaminobenzene (NH2, NH2, CH3) | 2-hydroxy-3-formyl-phenylazo-benzenesulfonic acid (OH, CHO, SO3H, N=N) | Cr | yellow |
| 47 | " | " | Co | medium brown |
| 48 | " | 2-hydroxy-3-formylphenylazo-naphthalenesulfonic acid (OH, CHO, N=N, SO3H) | Cr | medium brown |
| 49 | " | " | Co | brown |
| 50 | 4-nitro-1,2-diaminobenzene (NH2, NH2, NO2) | 2-hydroxy-3-formyl-chlorophenylazo (OH, CHO, Cl, N=N) | Co | brown |

TABLE-continued

| No. | I | II | III | IV |
|---|---|---|---|---|
| 51 | (1,2-diaminobenzene: NH₂, NH₂) | (OH, CHO, N=N–C₆H₄–SO₂NH₂ on phenol) | Co | brown |
| 52 | (4-methyl-1,2-diaminobenzene: NH₂, NH₂, CH₃) | (OH, CHO, NH–CO–CH₃, SO₃H, N=N on phenol) | Co | medium brown |

EXAMPLE 4

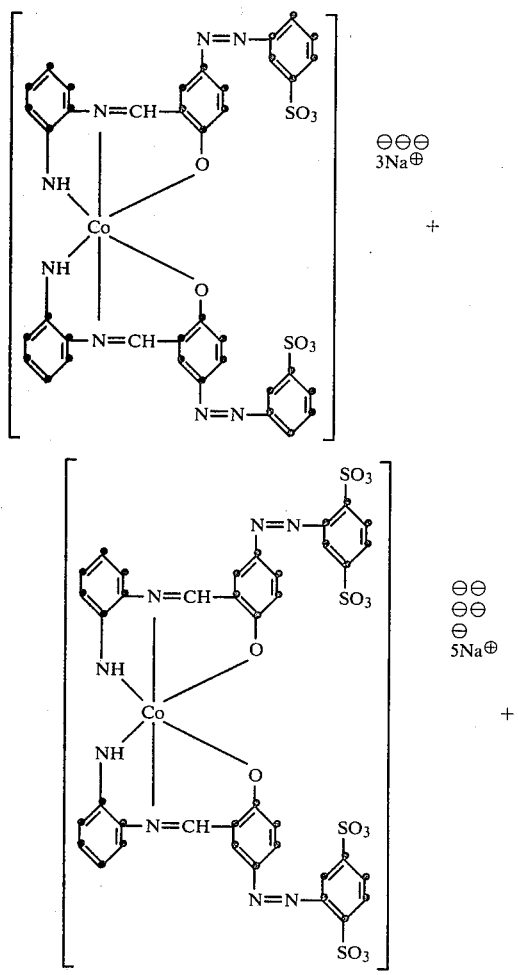

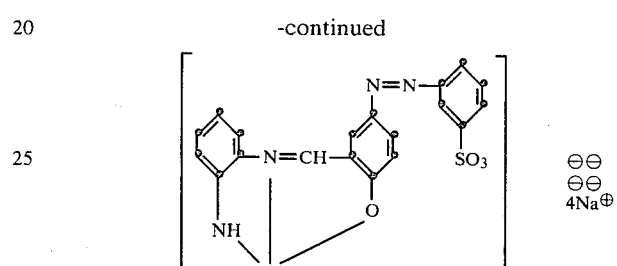

10.8 parts of 1,2-diaminobenzene, 15.3 parts of the monoazo dye obtained from diazotised 1-aminobenzene-2-sulfonic acid and salicylaldehyde and 19.3 parts of the monoazo dye obtained from diazotised 1-aminobenzene-2,5-disulfonic acid and salicylaldehyde are added to 250 parts by volume of water. After addition of 16.9 parts of cobalt sulfaheptahydrate (corresponding to 3.54 parts of cobalt, the reaction mixture is heated to 80° C. and kept at pH 8–8.5 with 2 N sodium hydroxide. When the metallisation is complete, the dye mixture is precipitated with sodium chloride, collected by filtration and dried. The resultant dark powder dyes leather in a medium brown shade of good fastness properties.

A dye having similar properties is obtained by substituting 12.2 parts of 3,4-diaminotoluene for 10.8 parts of 1,2-diaminobenzene in this Example.

Dyeing Procedure for leather 100 parts of garment suede leather are wet back at 50° C. for 2 hours in a solution of 1000 parts of water and 2 parts of 24% ammonia and subsequently dyed for 1 hour at 60° C. in a solution of 1000 parts of water, 2 parts of 24% ammonia and 3 parts of the dye of Example 2. A solution of 40 parts of water and 4 parts of 85% formic acid is then added and dyeing is continued for a further 30 minutes. The leather is then throughly rinsed and, if desired, treated for 30 minutes at 50° C. with 2 parts of a dicyandiamine/formaldehyde condensation product. A medium brown dyeing of good fastness properties is obtained.

Dyeing Procedure for Wool 100 parts of woollen knitting yarn are put at 50° C. into a dyebath which contains, in 4000 parts of water, 2 parts of the dye of Example 2, 4 parts of ammonium sulfate and 2 parts of a levelling agent. The bath is brought to the boil in the course of 45 minutes and kept at boiling temperature for a further 45 minutes. The goods are then taken out of the bath, rinsed thoroughly with cold water, and dried. A brown dyeing of good fastness properties is obtained.

Spray Procedure for Leather 3 parts of the dye of Example 26 listed in the table are dissolved in a solvent mixture consisting of 80 parts of dimethyl formamide and 17 parts of diethylene glycol. This dye solution is then sprayed on leather with a spraygun and the leather is subsequently dried. A brown dyeing of good fastness properties is obtained.

What is claimed is:

1. A 1:2 metal complex dye which contains, bonded to a heavy metal atom, two identical or different azomethines of the formula

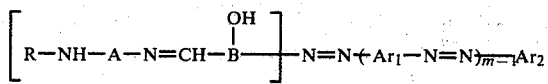

wherein R is hydrogen, unsubstituted $C_1$-$C_6$ alkyl, $C_1$-$C_6$-alkyl substituted by hydroxy or cyano, benzyl, phenyl, $C_1$-$C_6$-alkylsulfonyl, or phenylsulfonyl, wherein any phenyl ring of R is unsubstituted or substituted by cyano, halo, nitro, sulfo, carboxyl, sulfamoyl, N-$C_1$-$C_6$-alkylsulfamoyl, N,N-di-$C_1$-$C_6$-alkylsulfamoyl, $C_1$-$C_6$-alkylsulfonyl, phosphono, $C_1$-$C_6$-alkyl, $C_1$-$C_6$-alkoxy, benzoylamino, $C_1$-$C_6$-alkanoylamino or $C_1$-$C_6$-alkoxycarbonylamino; A is ethylene, propylene, 1,2-dicyanovinylene, 1,2-phenylene or 1,2-phenylene substituted by sulfo, sulfamoyl, N-$C_1$-$C_6$-alkylsulfamoyl, N,N-di-$C_1$-$C_6$-alkylsulfamoyl, $C_1$-$C_6$-alkyl, $C_1$-$C_6$-alkylsulfonyl, chlorine, bromine, nitro, $C_1$-$C_6$-alkoxy or carboxy; B is o-hydroxyphenyl or o-hydrophenyl substituted by one or more groups selected from the group consisting of $C_1$-$C_6$-alkyl and halo; $Ar_1$ is phenylene; phenylene substituted by sulfo, $C_1$-$C_6$-alkyl, or $C_1$-$C_6$ alkoxy; naphthylene or naphthylene substituted by sulfo; $Ar_2$ is phenyl; phenyl substituted by chloro, bromo, nitro, $C_1$-$C_6$-alkanoylamino, sulfo, sulfamoyl, N-$C_1$-$C_6$-alkylsulfamoyl, N,N-di-$C_1$-$C_6$-alkylsulfamoyl, $C_1$-$C_6$-alkylsulfonyl, $C_1$-$C_6$-alkyl, or $C_1$-$C_6$-alkoxy; naphthyl; or naphthyl substituted by sulfo; and m is 1 or 2; wherein at least one of R, A, $Ar_1$ and $Ar_2$ contain at least one water solubilizing group.

2. The dye of claim 1 wherein the metal is chromium or cobalt and B is o-hydroxyphenyl.

3. The dye of claim 2 wherein the metal is chromium or cobalt, and the azo group of B is bonded ortho or para to the hydroxyl group.

4. The dye of claim 3 of the formula

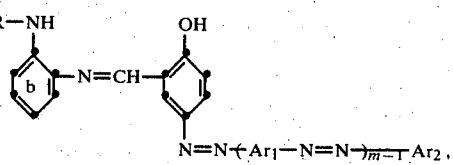

wherein R is hydrogen, phenyl or phenyl substituted by chloro, sulfo, methylsulfonyl or nitro, provided that at least one of R, $Ar_1$, $Ar_2$ and ring b contain at least one water-solubilizing group.

5. The dye of claim 4, wherein R is hydrogen, ring b is not further substituted or is substituted by sulfo, $C_1$-$C_6$-alkyl, chloro or nitro, m is 1, and $Ar_2$ is phenyl substituted by sulfo, $C_1$-$C_6$-alkyl, $C_1$-$C_6$-alkoxy, nitro, $C_1$-$C_6$-alkanoylamino or chloro, or naphthyl or naphthyl substituted by 1 or 2 sulfo groups, provided that when $Ar_2$ is phenyl, it is substituted by 1 or 2 sulfo groups.

6. The dye of claim 5, wherein ring b is not further substituted or is substituted by methyl.

7. The dye of claim 1, wherein the metal is chromium or cobalt and the two azomethines are identical.

* * * * *